United States Statutory Invention Registration [19]

[11] Reg. Number: H142

Wyluda [43] Published: Oct. 7, 1986

[54] CHANNELLED SABOT

[75] Inventor: Paul M. Wyluda, South River, N.J.

[73] Assignee: The United States of America as represented by the Secretary of the Army, Washington, D.C.

[21] Appl. No.: 713,131

[22] Filed: Mar. 18, 1985

[51] Int. Cl.[4] ..... F42B 13/16
[52] U.S. Cl. ..... 102/522
[58] Field of Search ..... 102/520–523

[56] References Cited

U.S. PATENT DOCUMENTS

| | | | |
|---|---|---|---|
| 3,186,342 | 1/1965 | Hancock, Jr. | 102/520 |
| 3,311,061 | 3/1967 | Roehrdanz | 102/520 |
| 3,551,972 | 1/1971 | Engel | 102/521 |

FOREIGN PATENT DOCUMENTS

| | | | |
|---|---|---|---|
| 1262830 | 3/1968 | Fed. Rep. of Germany | 102/520 |
| 2032070 | 4/1980 | United Kingdom | 102/430 |

*Primary Examiner*—Harold J. Tudor

*Attorney, Agent, or Firm*—Anthony Lane; Robert Gibson; Edward F. Costigan

[57] ABSTRACT

A one piece injection molded sabot with several channels on the inner diameter thereof. The channels run parallel to the fore and aft axis of the sabot. The ambient air rammed into the channels just after firing causes dilation of the sabot and results in rapid disengagement of the sabot and its associated projectile, thus minimizing interference with the desired trajectory of the projectile.

4 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHANNELLED SABOT

The invention described herein may be manufactured, used, and licensed by or for the Government for governmental purposes without the payment to me of any royalties.

BACKGROUND OF THE INVENTION

This invention relates to the concept of saboted ammunitipn as it pertains to large and small caliber weapon systems. Both fin-stabilized and spin-stabilized projectiles are sometimes fired from gun barrels with a much larger bore diameter than the nominal diameter of the projectile, to increase the muzzle velocity. The term projectile as used herein refers to the penetrator or bullet which is intended for terminal performance. In such weapon systems, the projectile is accelerated down the barrel by means of a sabot which has an outside diameter equal to the weapon's bore, to prevent the escape of gas ahead of the projectile. Just after the projectile and sabot leave the muzzle, the sabot separates from the projectile, caused by dynamic forces acting on these two components. A problem in the past with one-piece injection molded sabots used with spin-stabilized projectiles has been interference between the sabot and penetrator or bullet during sabot discard. During discard this type of sabot has a tendency to rotate slightly about its lateral axis. This usually occurs while the projectile is still within the confinement of the sabot, causing the projectile to yaw. This yaw affects the accuracy of the projectile and can also adversely affect the terminal performance of the projectiles, such as bullets or penetrators, at the targets.

One solution to this interference problem in the prior art was the use of a segmented sabot which comprised several pieces which fitted around the penetrator or bullet in the manner of a jig-saw puzzle. Upon exit from the muzzle, such a segmented sabot would quickly disengage from the projectile with minimum interference from centrigugal force, for spin-stabilized projectiles.

Segmented sabots are more difficult to manufacture and assemble and hence are more costly than one-piece sabots. Tighter tolerances are required and multi-operating stages during the assembling process are also required. This is both time consumming and costly.

The channelled sabot of the present invention is a one-piece sabot which has the cost advantages of the conventional sabots and the performance capability of the aforementidned segmented sabots when used with spin-stabilized projectiles.

SUMMARY OF THE INVENTION

The channelled sabot of the present invention comprises channels or slots on the inside diameter of the one-piece sabot, with the channels running longitudinally at least to the base or aft end of the projectile. These channels, with the open ends thereof facing forward, permit the ambient air to be rammed into the channels and the base or aft end of the projectile. This air pressure between the sabot and projectile performs numerous functions. It relieves any pressure differentials during separation. It causes the sabot to dilate upon exit from the muzzle, thus relieving any frictional forces between the sabot and the penetrator/bullet, thus eliminating any yaw to the penetrator/bullet caused by the sabot during discard. This promotes a rapid discard of the sabot with minimal interference to the projectile's trajectory. The channels also provide a weakened line in the sabot's structure which facilitates the aforementioned dilation.

It is this an object of the invention to provide a novel channelled sabot of improved performance.

Another object is to provide a sabot with a purality of channels in its inner diameter which run longitudinally or parallel to the bore of the gun barrel in which said sabot is used.

A further object of the invention is to facilitate the use of a one-piece injection molded sabot which rapidly disengages from its associated projectile immediately upon exit from a muzzle, with minimal interference between the projectile and the sabot during disengagement.

These and other objects and advantages of the invention will become apparent from the following detailed description and the drawings.

DETAILED DESCRIPTION OF A PREFERRED EMBODIMENT

Figure 1A:
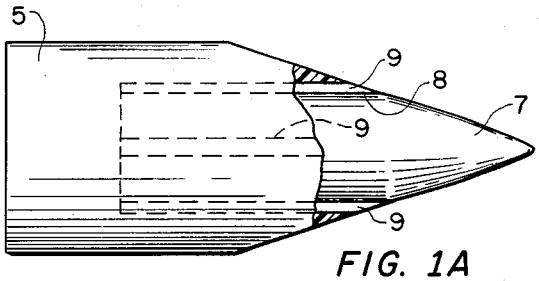
FIGS. 1A and 1B are side and end views, respectively, of a channelled sabot with a projectile mounted therein.
Figure 1B:
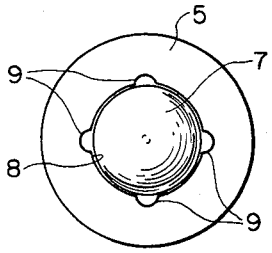
Figure 2A:
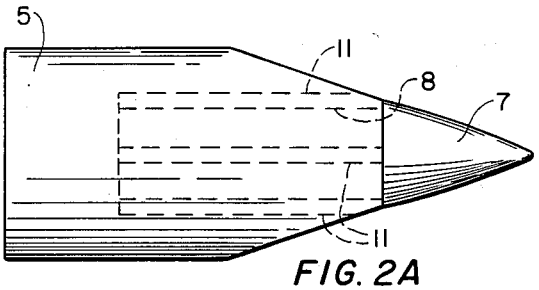
FIGS. 2A, 2B, 3A and 3B are similar views of channelled sabots with different types and numbers of channels therein.
Figure 2B:
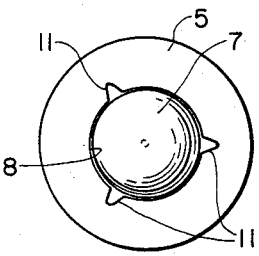
Figure 3A:
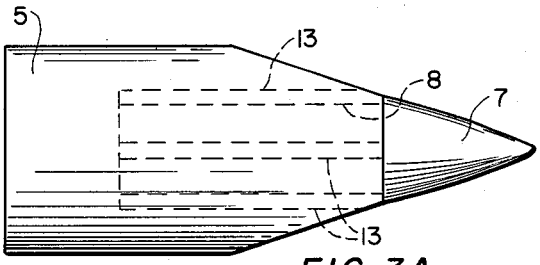
Figure 3B:
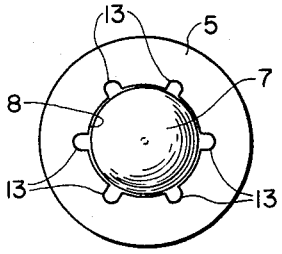

The side and front views of FIGS. 1A and 1B show the sabot and projectile assembly prior to firing, with the nose of the projectile 7 protruding from the forward end of sabot 5. The inner diameter 8 of the sabot of this embodiment is provided with four equally spaced semi-cylindrical channels, 9, extending longitudinally along the entire length of the inner diameter of the sabot. The variations of this structure illustrated in FIGS. 2A, 2B, 3A and 3B include different numbers of channels with different channel cross-sectional shapes, however the operating principles or mode of operation of all of these embodiments is the same. The embodiment of FIGS. 2A and 2B includes three equally spaced channels 11, which all have generally triangular cross sections. The embodiment of FIGS. 3A and 3B has five equally spaced channels with generally trapezoidal cross sections. In FIGS. 2A, 2B, 3A and 3B the components are indicated by the same reference numbers as are the same components in FIGS. 1A and 1B.

Figure 4:
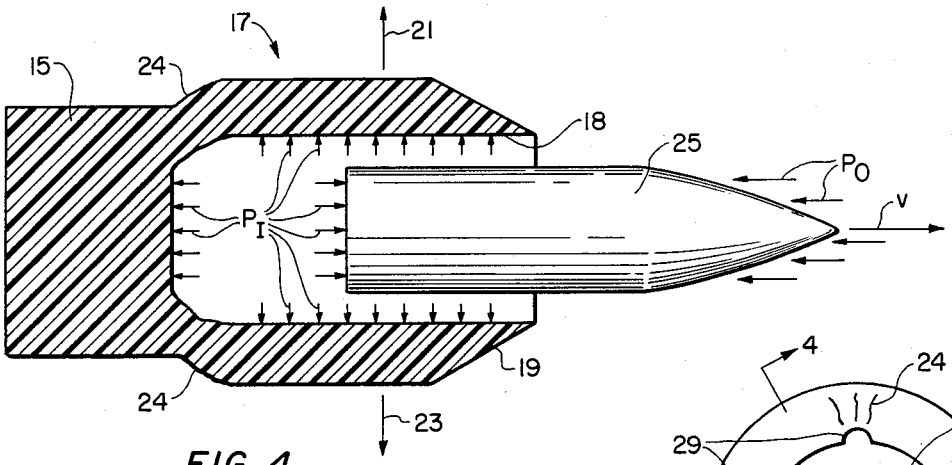
FIGS. 4 and 5 are side and end views, respectively, of a sabot and a projectile just after firing, showing the dilation of the sabot.

FIG. 4 shows a diametric cross sectional view of a channelled sabot, such as those illustrated herein, just after firing, showing how this structure causes dilation of the sabot with a resultant rapid disengagement of the sabot 15 and the projectile 25. In the cross-sectional view of the sabot 15, diametrically opposed portions thereof, 17 and 19, have dilated as indicated by the arrows 21 and 23 to open up the inner diameter 18 of the sabot, to relieve the frictional forces between the sabot and projectile. The arrow, v, indicates the desired trajectory of the projectile and the arrows $P_O$ indicate air drag or pressure on the nose of the projectile. The arrows $P_I$ indicate the force or pressure inside of the base of the sabot, which pressure aids in the aforementioned dilation. The number and cross sectional shapes and areas of the channels would be selected to provide the required dilation. The design of such a channelled sabot would require a knowledge of the weapon's muzzle velocity which would be one factor in determining the pressures $P_O$ and $P_I$. The inside pressure $P_I$ would be utilized to cause the sabot in the area 24 to be stressed into its plastic zone. The weakened plastic material would then easily dilate as illustrated. The channels can be considered scoring lines which weaken the sabot in these areas to facilitate the dilation.

Figure 5:
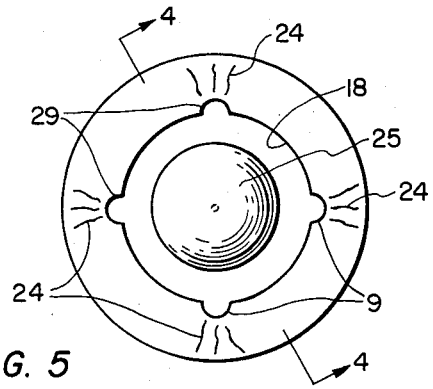

FIG. 5 is a front view of the sabot and projectile of FIG. 4, wherein the same reference characters indicate the same parts. This sabot is seen to comprise four equally spaces channels, 29, like that of FIGS. 1A and 1B.

Currently available materials make this invention practical for small weapons up to 30 mm in caliber. Engineering models were built and tested utilizing caliber 0.50 ammunition with the test items fired from a standard caliber 0.50 pressure barrel.

While the invention has been described in connection with illustrative embodiments, obvious variations therein will occur to those skilled in this art, accordingly the invention should be limited only by the scope of the appended claims.

What is claimed is:

1. A sabot having a body provided with a bore adapted to receive a projectile, said body having a plurality of equally spaced channels therein, said channels running longitudinally within the interior of the said body, parallel to the axis of said bore, said channels being designed to permit rapid disengagement of said sabot and said projectile immediately after the firing thereof.

2. The sabot of claim 1 wherein the number of said channels is four and the cross-sectional shape thereof is semi-circular.

3. The sabot of claim 1 wherein the number of said channels is three and the cross-sectional shape thereof is generally triangular.

4. The sabot of claim 1 wherein the number of said channels is six and the cross-sectional shape thereof is generally trapezoidal.

* * * * *